(12) United States Patent
Pomish et al.

(10) Patent No.: US 11,325,596 B2
(45) Date of Patent: May 10, 2022

(54) ELECTRONIC STABILITY MANAGEMENT FOR OVERSTEER ENGAGEMENT BASED ON SENSOR DATA

(71) Applicant: Toyota Motor Engineering and Manufacturing North America, Inc., Plano, TX (US)

(72) Inventors: Ethan W. Pomish, Livonia, MI (US); Miles J. Johnson, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 154 days.

(21) Appl. No.: 16/897,625

(22) Filed: Jun. 10, 2020

(65) Prior Publication Data
US 2021/0387618 A1    Dec. 16, 2021

(51) Int. Cl.
*B60W 30/02*    (2012.01)
*B60W 30/10*    (2006.01)
*B60W 10/18*    (2012.01)

(52) U.S. Cl.
CPC ............ *B60W 30/10* (2013.01); *B60W 10/18* (2013.01); *B60W 2420/42* (2013.01); *B60W 2552/30* (2020.02); *B60W 2552/53* (2020.02)

(58) Field of Classification Search
None
See application file for complete search history.

(56) References Cited

U.S. PATENT DOCUMENTS

| 5,862,503 | A | 1/1999 | Eckert et al. |
| 7,892,078 | B2* | 2/2011 | Tipping ................. G01C 21/00 463/7 |
| 8,718,897 | B2 | 5/2014 | Wright et al. |
| 2004/0249533 | A1* | 12/2004 | Wheals .................... B60T 8/172 701/36 |
| 2004/0263693 | A1* | 12/2004 | Herbrich ................. A63F 13/10 348/699 |
| 2006/0074535 | A1* | 4/2006 | Gim ...................... G01M 17/06 701/41 |
| 2006/0273657 | A1 | 12/2006 | Wanke et al. |
| 2007/0050112 | A1* | 3/2007 | Kroehnert ........... B60T 8/17555 701/41 |
| 2011/0178689 | A1* | 7/2011 | Yasui .................... B60W 30/14 701/70 |
| 2013/0179004 | A1* | 7/2013 | Nihei .................. B60T 8/17554 701/1 |

(Continued)

OTHER PUBLICATIONS

Kone, Kiran, "Lateral and longitudinal control of an autonomous racing vehicle," Master's degree thesis, Politecnico Di Torino, 2018-2019, 90 pages.

*Primary Examiner* — Jonathan M Dager
(74) *Attorney, Agent, or Firm* — Jordan IP Law, LLC

(57) ABSTRACT

Apparatuses, systems, and methods relate to technology to control one or more systems to mitigate an oversteer condition of a vehicle or allow the oversteer condition, identify a curve in a roadway based on sensor data associated with the vehicle, based on the curve in the roadway, conduct an identification that the oversteer condition is to be allowed for at least a portion of the curve, and in response to the identification that the oversteer condition is to be allowed, controlling the one or more systems to allow the oversteer condition for the at least the portion of the curve.

20 Claims, 8 Drawing Sheets

(56) References Cited

U.S. PATENT DOCUMENTS

| | | | |
|---|---|---|---|
| 2013/0226414 A1* | 8/2013 | De Luca | B62D 37/02 |
| | | | 701/49 |
| 2017/0320517 A1* | 11/2017 | Michelis | B62D 6/003 |
| 2018/0188031 A1 | 7/2018 | Samper et al. | |
| 2020/0114903 A1* | 4/2020 | Weissenmayer | B60W 10/04 |
| 2020/0324649 A1* | 10/2020 | Gully | B60W 10/14 |

* cited by examiner

ELECTRONIC STABILITY MANAGEMENT FOR OVERSTEER ENGAGEMENT BASED ON SENSOR DATA

TECHNICAL FIELD

Embodiments generally relate to leveraging various sensors to analyze, track and predict user preferred engagement of oversteer conditions in vehicles and allow such oversteer conditions to proceed. For example, some embodiments permit the vehicle to oversteer during as the vehicle turns.

BACKGROUND

A slip angle of a tire is the difference between where the tire is pointed and where the tire is traveling. The slip angles of tires of a vehicle may influence the operation conditions of the vehicle. For example, when the tires on a vehicle lose traction, the tires may be unable to change a direction of travel of the vehicle causing understeer and oversteer. In an understeer condition the slip angles of the front tires are greater than the slip angles of the rear tires, which may cause a vehicle to turn less sharply than what normally occurs when the driver manipulates a steering system. In an oversteer condition, the rear tires have a greater slip angle than the front tires which may cause a vehicle to turn more sharply than what normally occurs when the driver manipulates a steering system.

BRIEF SUMMARY

In some embodiments, a vehicle, comprises at least one sensor to generate sensor data, and an oversteer mitigation sub-system coupled with the at least one sensor, where the oversteer mitigation sub-system includes at least one processor and at least one memory having a set of instructions, which when executed by the at least one processor, cause the oversteer mitigation sub-system to control one or more systems to mitigate an oversteer condition of the vehicle or allow the oversteer condition, identify a curve in a roadway based on the sensor data, based on the curve in the roadway, conduct an identification that the oversteer condition is to be allowed for at least a portion of the curve, and in response to the identification that the oversteer condition is to be allowed, control the one or more systems to allow the oversteer condition for the at least the portion of the curve.

In some embodiments, at least one non-transitory computer readable storage medium comprises a set of instructions, which when executed by a computing platform, cause the computing platform to control one or more systems to mitigate an oversteer condition of a vehicle or allow the oversteer condition, identify a curve in a roadway based on sensor data associated with the vehicle, based on the curve in the roadway, conduct an identification that the oversteer condition is to be allowed for at least a portion of the curve, and in response to the identification that the oversteer condition is to be allowed, control the one or more systems to allow the oversteer condition for the at least the portion of the curve.

In some embodiments, a method comprises controlling one or more systems to mitigate an oversteer condition of a vehicle or allow the oversteer condition, identifying a curve in a roadway based on sensor data associated with the vehicle, based on the curve in the roadway, conducting an identification that the oversteer condition is to be allowed for at least a portion of the curve, and in response to the identification that the oversteer condition is to be allowed, controlling the one or more systems to allow the oversteer condition for the at least the portion of the curve.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1A:
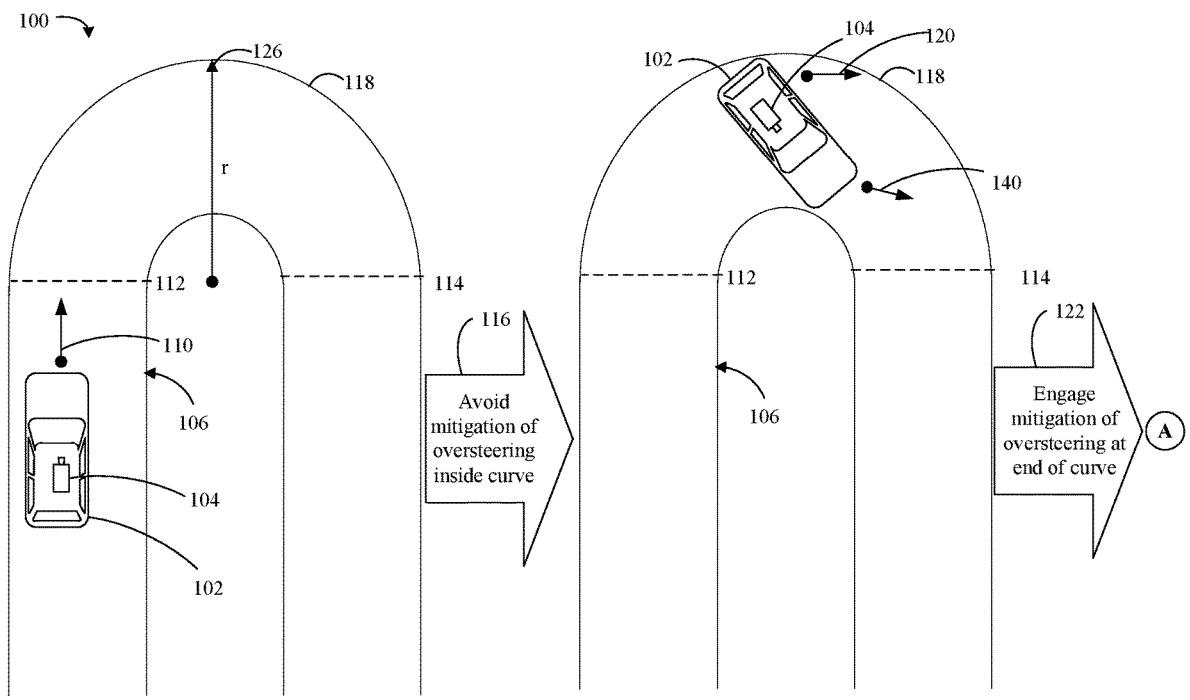
FIGS. 1A and 1B are diagrams of an example of a process to permit oversteering according to an embodiment.

Turning now to FIG. 1A, a process 100 illustrates a vehicle 102 that permits oversteering under certain condition and identifies a point-of-engagement to mitigate oversteering based on sensor data (e.g., localization and imaging data). In contrast, some other vehicles may always mitigate an oversteer condition when the oversteer condition is detected which may result in reduced driving speeds and a degraded driver experience (e.g., a feeling of being "bogged down"). The vehicle 102 may permit the oversteer condition as the vehicle 102 proceeds around the curve 118 to allow a driver of the vehicle 102 to maneuver through curve 118 at increased speeds. Doing so may enhance performance (e.g., faster cornering speeds, etc.) and enhance a driver experience. In some embodiments, the vehicle 102 may also monitor characteristics of the vehicle 102 for stability and mitigate the oversteer condition if the vehicle 102 is detected to be unstable.

Thus, the vehicle 102 may allow the oversteer condition (e.g., suppress and/or prevent mitigation of the oversteer condition) to enhance performance. The vehicle 102 may analyze a path of travel 110 of the vehicle 102 along roadway 106 using various sensors, such as imaging sensor 104 (e.g., a forward facing camera). The various sensors may generate sensor data. The vehicle 102 may analyze the path of travel 110 of the vehicle 102 along the roadway 106 to identify a curve 118 in the roadway 106. Based on the path of travel 110, the vehicle 102 may determine that the vehicle 102 will proceed along the curve 118 and avoid mitigation of the oversteer condition based on the identified curve. For example, the vehicle 102 may analyze images of the image sensor 104 to detect the curve 118, and characteristics of the curve 118 such as radius r 126, a start position 112 of the curve 118 (e.g., an entrance position) and an end position 114 of the curve 118 (e.g., an exit position).

The vehicle 102 may be able to mitigate oversteering conditions through various techniques. For example, the vehicle 102 may include an oversteer mitigation sub-system (e.g., electronic stability control system and/or a traction control system) that apply driver assisted techniques through one or more systems (e.g., braking system, power system, etc.) to mitigate (e.g., reduce and/or stop) the oversteer conditions. For example, the oversteer mitigation sub-system may selectively apply brakes to the rear wheels, execute load rebalancing, cause adjustments to height of the center of gravity, etc. to mitigate the oversteer condition.

In some examples, a driver may prefer to have the vehicle 102 move into an "oversteer" posture (e.g., oversteer condition) as induced by a wheel-spin. The oversteer mitigation sub-system may identify oversteer conditions based on individual wheel speeds (e.g., accelerometer(s)) as inputs). Rather than immediately correcting the oversteer condition, the oversteer mitigation sub-system may consider a proper posture and/or positioning of the vehicle 102 for the roadway 106 geometry to determine whether to correct the oversteer condition. Thus, in some examples the oversteer mitigation sub-system may avoid mitigation of the oversteer condition for at least part of the curve 118 based on the roadway 106 geometry.

For example, the vehicle 102 may identify that the roadway 106 includes the curve 118. The vehicle 102 may identify characteristics of the curve 118, such as the radius r 126 of the curve 118. The vehicle 102 may determine that the radius r 126 is below a turn threshold and thus, the curve 118 may be considered a "sharp" or "hairpin" turn. Based in part on the identification that radius r 126 is below the turn threshold, the vehicle 102 may suppress mitigation of oversteer conditions by the one or more systems. As illustrated, the radius r 126 may be measured between the center point of the curve 118 and the outer perimeter of the roadway 106 at the curve 118. In some embodiments, the radius r 126 may be measured between the center point of the curve 118 and the inner perimeter of the roadway 106 at the curve 118.

In some embodiments, the vehicle 102 may identify the curvature of the curve 118 and compare the curvature to a threshold to identify whether to mitigate oversteering or allow oversteering. If the curvature is above the threshold, the vehicle may enable oversteering.

In some embodiments, the vehicle 102 may also determine a velocity and/or acceleration of the vehicle and determine whether to permit the oversteer condition based on the velocity and/or the acceleration. For example, the acceleration and/or velocity may reflect the intent of the driver to purposefully induce the oversteer condition. For example, as the velocity of the vehicle 102 increases, the probability that the vehicle 102 will oversteer may similarly increase. Therefore, some drivers may intentionally increase the velocity of the vehicle 102 (e.g., accelerate) and/or maintain the velocity above a threshold to purposefully induce an oversteer condition. As such, if the user controls the velocity of the vehicle 102 (e.g., accelerates) as the user approaches the curve 118 and/or maintains the velocity above a velocity threshold, the vehicle 102 may permit the oversteer condition to reflect the driver's intention to induce the oversteer condition. In contrast, if the vehicle 102 detects deceleration and/or that the velocity is below a threshold, the vehicle 102 may mitigate the oversteer condition (e.g., disallow the oversteer condition) as the deceleration and/or lower velocity may indicate a user's intent to avoid oversteering. In some embodiments, the vehicle 102 may determine the acceleration, deceleration and/or velocity when the vehicle 102 is proximate (e.g., within a certain range) of the curve 118. In the present example, the vehicle 102 may permit the oversteer condition based in part on an increase in acceleration of the vehicle 102 and the velocity of the vehicle 102 being above a threshold.

In some examples, the vehicle 102 may further identify whether any dangerous conditions exist. For example, if an obstruction is detected on the roadway 106, the vehicle 102 may identify that the oversteer condition is should be mitigated. In some examples, the weather may also be considered. For example, if the vehicle 102 detects adverse weather conditions (e.g., snow, ice, rain, etc.) that may result in unstable driving conditions (e.g., slick roads), the vehicle 102 may not permit the oversteer condition and may mitigate the oversteer condition. In the present example, the vehicle 102 may identify that no such conditions exist.

Thus, in the present example, the vehicle 102 may allow the oversteer condition to occur without reducing, mitigating or taking otherwise corrective action to stop the oversteer condition. In particular, the vehicle 102 may control and/or disable the one or more systems that may typically mitigate the oversteer condition based on the factors described above. As such, when the vehicle 102 enters an entrance point of the curve 118, the vehicle 102 may allow the oversteer condition. That is, the vehicle 102 may avoid mitigation of the oversteering (e.g., driver assistance techniques for mitigation) inside the curve 116, 118.

As the vehicle 102 enters the oversteer condition, the rear of the vehicle 102 may slide in direction 120 while the front of the vehicle 102 may slide along direction 140. The rear may swing out farther than the front of the vehicle 102. In doing so, an enhanced driving system may be achieved. For example, if the vehicle 102 is a performance car, the driver may execute an oversteer condition around the curve 118 (e.g., a hair-pin corner), to "kick" the back end of the vehicle 102 out by applying more power and breaking the rear tires loose. This oversteer condition may allow the driver to carry more speed through the curve 118 which may be desirable in some examples and may lead to a more natural driving feeling (e.g., does not feel bogged down if oversteer condition is mitigated through rear brake actuation).

Figure 1B:
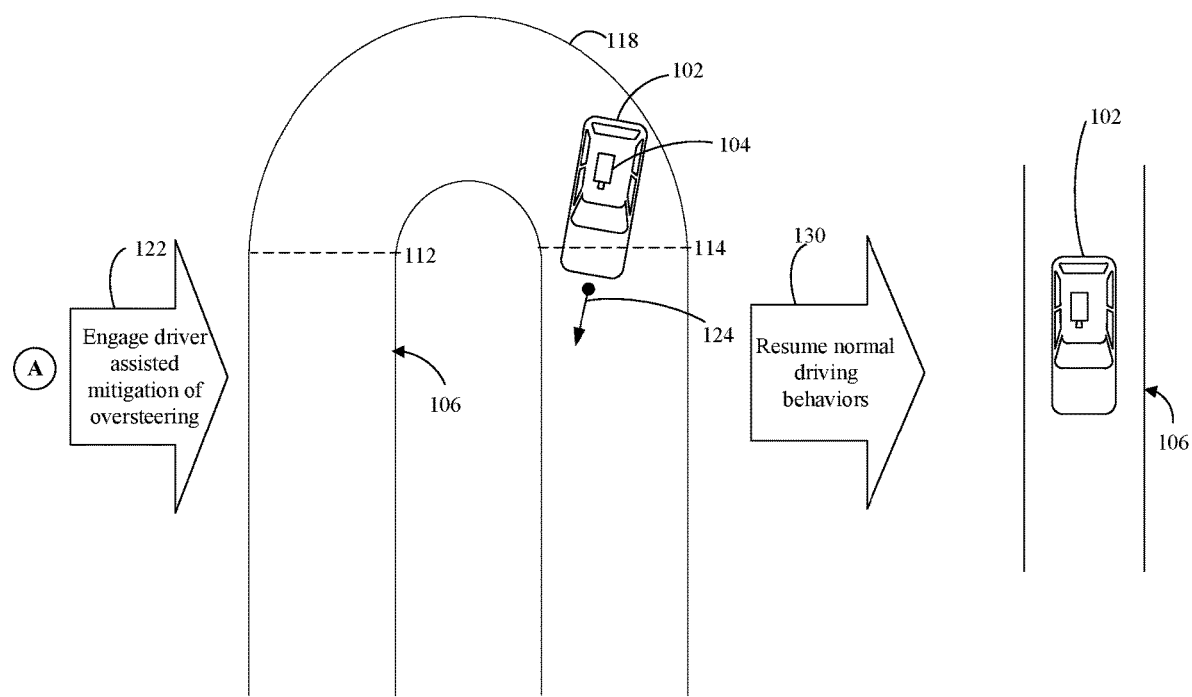

The vehicle 102 may engage mitigation of oversteering at the end position 114 of the curve 118, 122. Thus, the vehicle 102 determines that the point-of-engagement of mitigation of the oversteering is at the end position 114. Turning to FIG. 1B, the vehicle 102 may be in an oversteer condition at the end position 114 of the curve 118. As a result, the vehicle has a direction of travel 124 that may potentially lead to a departure of the vehicle 102 from the roadway 106 and/or inducing a spin out condition. At the end position 114 it is likely that the oversteer condition is no longer desirable and may in fact lead to potential difficulties. Thus, the vehicle 102 may mitigate the oversteering to correct the direction of travel 124 of the vehicle 102. The vehicle 102 may then resume normal driving behaviors 130 so that the vehicle 102 travels along roadway 106.

In some examples, the vehicle 102 may determine whether to mitigate the oversteer condition or permit the oversteer condition to avoid mitigation of the oversteer condition based on various sensors of the vehicle 102. For example, the sensors may include light detection and ranging (LIDAR) sensors, imaging sensors, proximity sensors, infrastructure to vehicle (I2V) communication sensors and so forth. Thus, the vehicle 102 may determine whether to mitigate the oversteer condition or permit the oversteer condition based on image data, localization data or light detection and ranging data.

In some embodiments, the vehicle 102 may identify lane markings and/or signs along the roadway 106 to identify the curve 118. In some embodiments, the vehicle 102 may include a localization system (e.g., global positioning satellite position, inertia sensors, maps such as high-definition maps, matching components) to pin-point the location of the vehicle 102 and direction of travel. In some examples, I2V data may provide the localization data and high definition maps.

Figure 2:
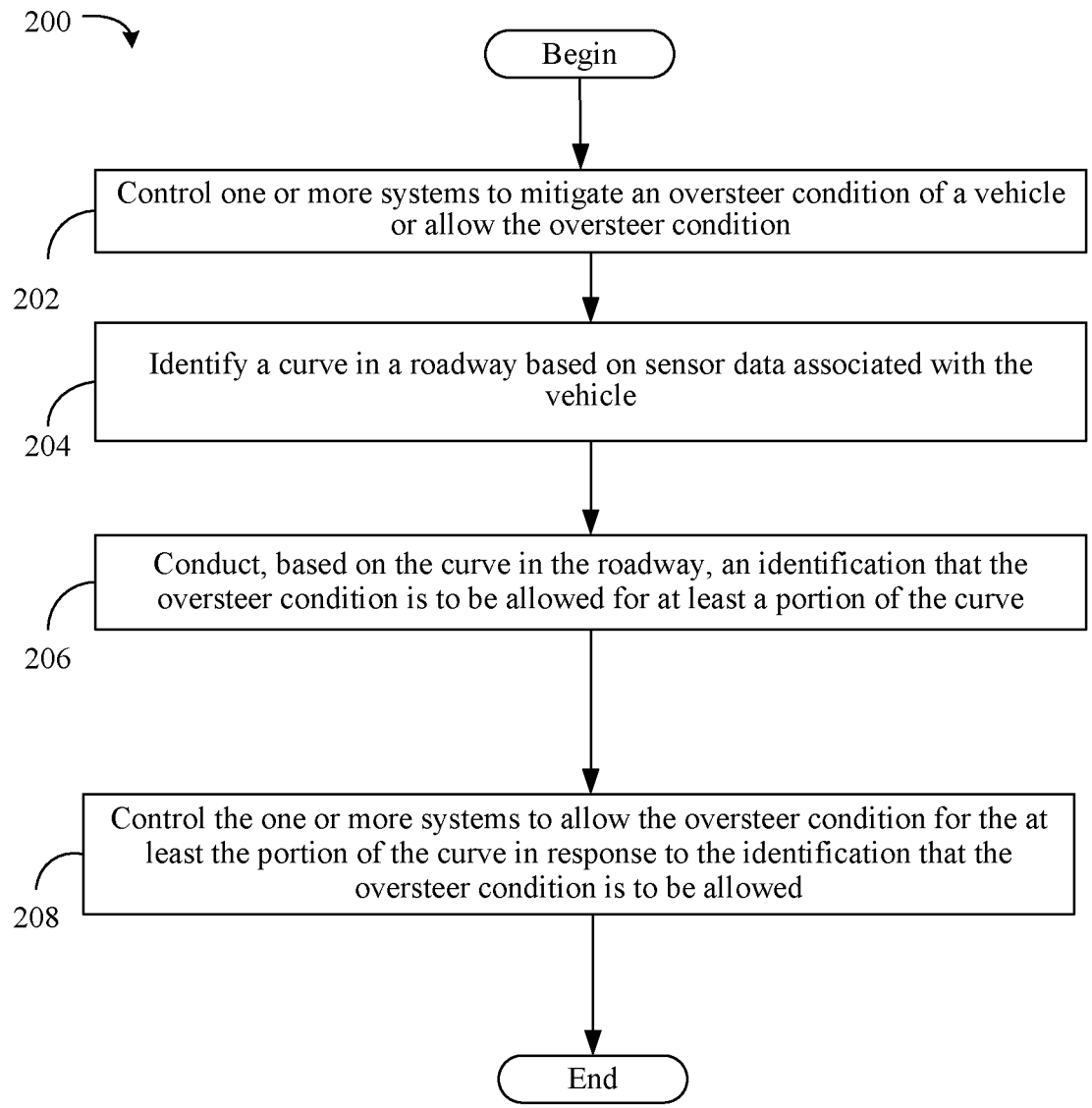
FIG. 2 is a flowchart of an example of a method of permitting an oversteer condition according to an embodiment.

FIG. 2 shows a method 200 of permitting an oversteer condition of a vehicle. The method 200 may generally be implemented in conjunction with any of the embodiments described herein, for example the vehicle 102 of FIG. 1. In an embodiment, the method 200 is implemented in logic instructions (e.g., software), configurable logic, fixed-functionality hardware logic, non-transitory computer readable instructions that are executable to implement method 200, circuitry, etc., or any combination thereof.

Illustrated processing block 202 controls one or more systems to mitigate an oversteer condition of a vehicle or allow the oversteer condition. Illustrated processing block 204 identifies a curve in a roadway based on sensor data associated with the vehicle. Illustrated processing block 206 conducts, based on the curve in the roadway, an identification that the oversteer condition is to be allowed for at least a portion of the curve. Illustrated processing block 208 controls the one or more systems to allow the oversteer condition for at least a portion of the curve in response to the identification that the oversteer condition is to be allowed.

Figure 3:
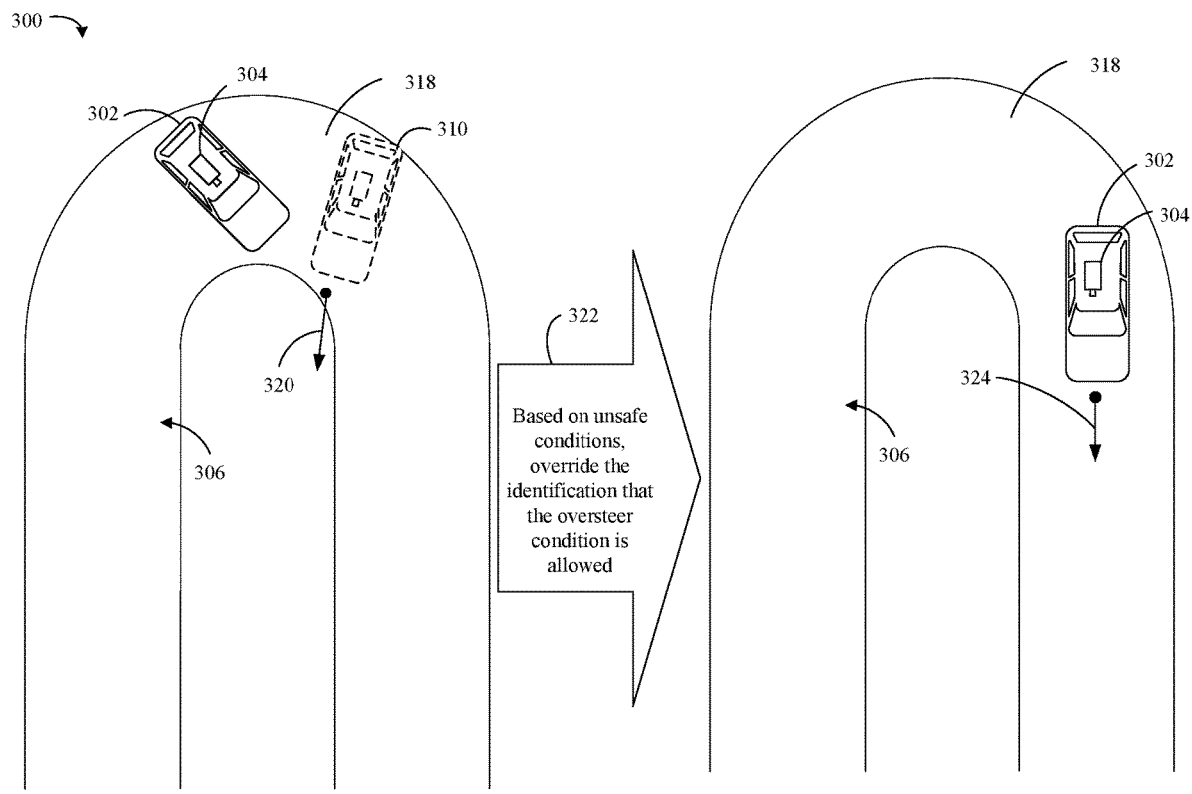
FIG. 3 is a diagram of an example of a process to monitor for unsafe positioning during an oversteer condition and mitigate the oversteer condition based on the unsafe positioning according to an embodiment.

FIG. 3 illustrates a process 300 to monitor for unsafe conditions during an oversteer condition of the vehicle 302 and mitigate the oversteer condition. In this example, the vehicle 302 may have determined that an oversteer condition is allowed, and the vehicle 302 is currently in the oversteer condition. Therefore, the vehicle 302 has not mitigated the oversteer condition for a portion of a curve 318 of the roadway 306.

The vehicle 302 may continuously monitor sensor data to identify whether the vehicle 302 is and/or is predicted to be in an unsafe condition. For example, the vehicle 302 may include imaging sensor 304. Image data of the imaging sensor 304 may be analyzed to determine current conditions of the oversteer condition. Based on the image data, the vehicle 302 may predict that if the vehicle 302 continues to oversteer in the curve 318 under the current conditions (e.g. at a present velocity, acceleration and from a current position), the vehicle 302 will be positioned at location 310 and have a movement of direction along direction 320. The vehicle 302 may determine that location 310 is unsafe as the vehicle 302 may be positioned to drive off the roadway 306 along direction 320. As such, the vehicle 310 may determine that the oversteer condition is unsafe.

Based on the determination that the oversteer condition is unsafe, the vehicle 302 may override the decision to allow the oversteer condition and begin corrective assisted actions. For example, the vehicle 310 may, based on the unsafe conditions, override the identification that the oversteer condition is allowed 322 to begin mitigation of the oversteer condition. As such, the oversteer condition is allowed for at least a portion of the curve 318 and is then mitigated for the remainder of the curve 318.

Due to the corrective actions of the vehicle 302, the vehicle 302 may be guided to a neutral position on the roadway 306. The vehicle 302 may thus drive along direction 324 and proceed straight down the roadway 306 rather than driving off the roadway 306. In some embodiments, the vehicle 302 may only correct the oversteer condition to the extent necessary to maintain the vehicle 302 on the roadway 306.

Figure 4:
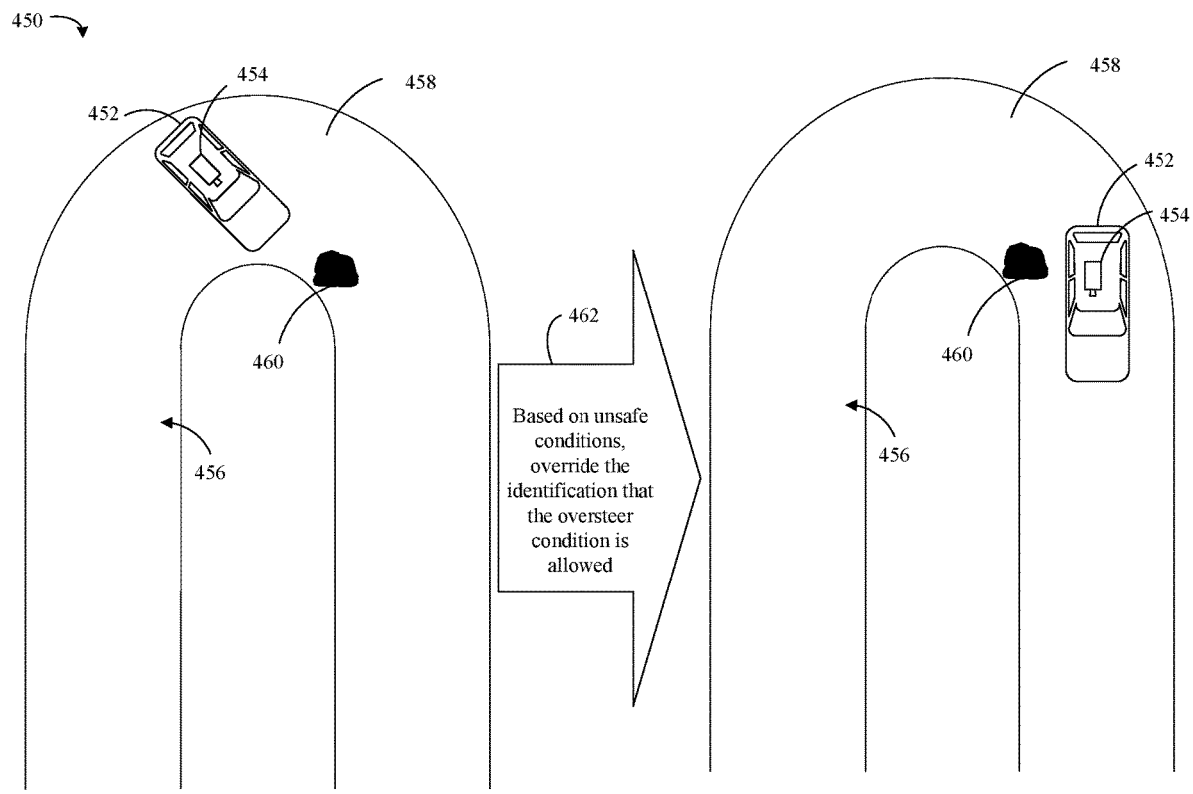
FIG. 4 is a diagram of an example of a process to monitor for obstacles during an oversteer condition and mitigate the oversteer condition based on the oversteer condition according to an embodiment.

FIG. 4 illustrates a process 450 to monitor for unsafe conditions during an oversteer condition of the vehicle 452. In this example, the vehicle 452 may have determined that an oversteer condition is allowed, and the vehicle 452 is currently in the oversteer condition. Therefore, the vehicle 452 has not mitigated the oversteer condition for a portion of a curve 458 of the roadway 456.

The vehicle 452 may however continuously monitor sensor data to identify whether the vehicle 452 is and/or will be in an unsafe condition. For example, the vehicle 452 may include imaging sensor 454. Image data of the imaging sensor 454 may be analyzed to determine current conditions of the oversteer condition. Based on the image data, the vehicle 452 may identify an obstacle 460 in curve 458 of the roadway 456. The vehicle 452 may determine that obstacle 460 is in the curve 458, and therefore presents an unsafe condition as the vehicle 452 may collide with the vehicle 452.

Thus, the vehicle 452 may override the decision to allow the oversteer condition and begin corrective assisted actions. For example, the vehicle 452 may, based on the unsafe conditions, override the identification that the oversteer condition is allowed 462 to begin mitigation of the oversteer condition. As such, the oversteer condition is allowed for at least a portion of the curve 458 and is then mitigated for the remainder of the curve 458 to avoid accidently colliding with the obstacle 460.

Due to the corrective actions of the vehicle 452, the vehicle 452 may be guided to a neutral position on the roadway 456. The vehicle 452 may proceed straight down the roadway 456 having avoided obstacle 460. In some embodiments, the vehicle 452 may only correct the oversteer condition to the extent necessary to avoid obstacle 460 on the roadway 456.

While the obstacle 460 is shown as being on the roadway 456, the vehicle 452 may similarly respond to mitigate the oversteer condition if the obstacle 460 was positioned proximate the curve 458 but outside the roadway 456. For example, an oversteer condition may be difficult to control. If the vehicle 452 detects an obstacle proximate the curve 458 that may cause serious injury if struck by the vehicle 452, the vehicle 452 may mitigate the oversteer condition to reduce the probability of striking the obstacle.

Figure 5:
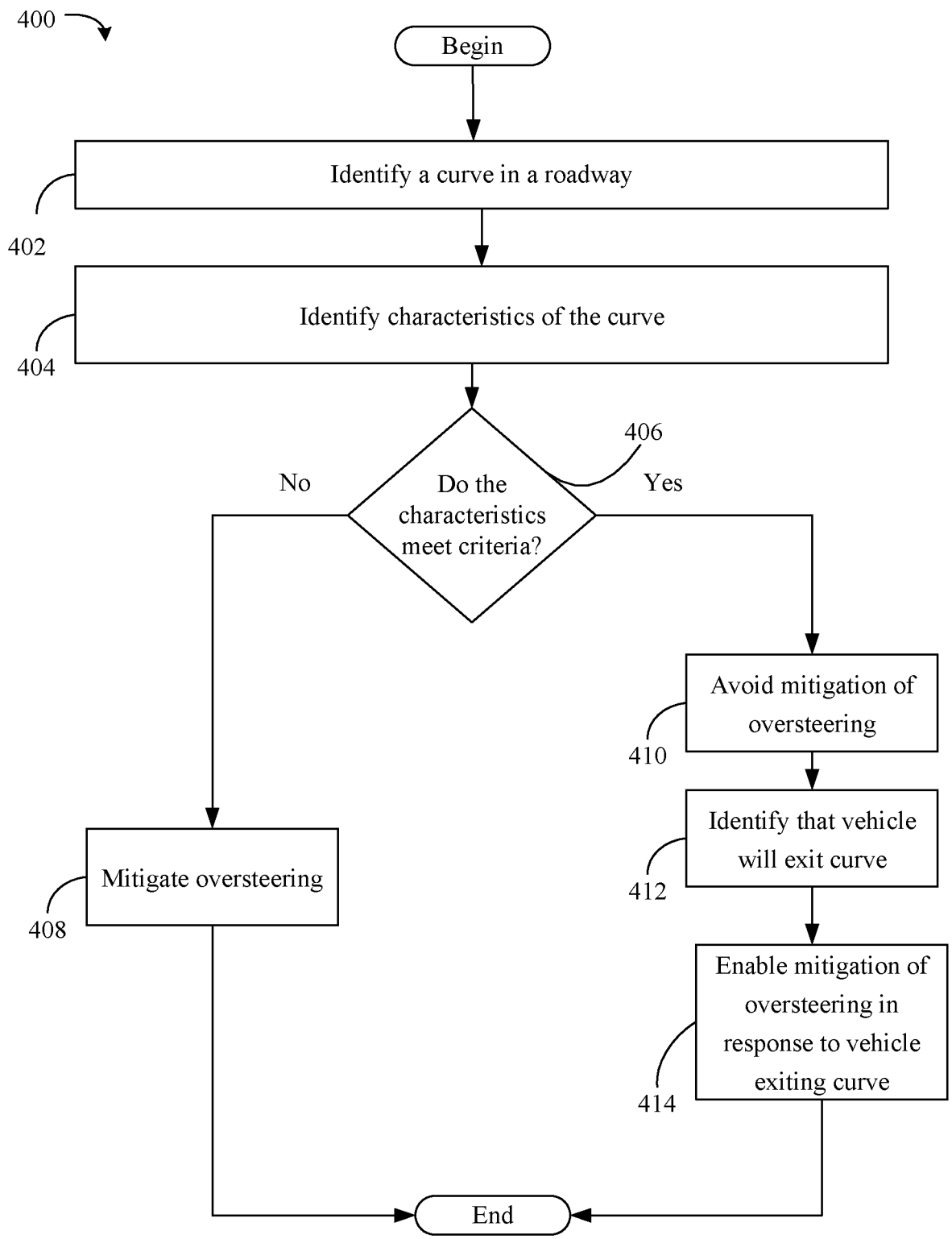
FIG. 5 is a flowchart of an example of a method of oversteer engagement according to an embodiment.

FIG. 5 shows a method 400 of oversteer engagement. The method 400 may generally be implemented in conjunction with any of the embodiments described herein, for example the vehicle 102 of FIG. 1, the method 200 of FIG. 2, the vehicle 302 of FIG. 3 and the vehicle 452 of FIG. 4. In an embodiment, the method 400 is implemented in logic instructions (e.g., software), configurable logic, fixed-functionality hardware logic, non-transitory computer readable instructions that are executable to implement method 400, circuitry, etc., or any combination thereof.

Illustrated processing block 402 identifies a curve in roadway. Illustrated processing block 404 identifies characteristics of the curve. Illustrated processing block 406 determines whether the characteristics meet a criteria for oversteering. For example, illustrated processing block 406 may determine whether a radius of the curve is sufficiently small to benefit from oversteering and/or whether the curve is a hairpin turn, if obstacles exist on the roadway, if the driver accelerates near the curve, if the velocity is above a threshold and so forth (described above). If so, illustrated processing block 410 permits the oversteering condition and avoids mitigation of oversteering. Illustrated processing block 412 identifies that the vehicle will exit the curve. Illustrated processing block 414 then enables mitigation of the oversteering in response to the vehicle exiting the curve. If the characteristics do not meet the criteria, illustrated processing block 408 may mitigate the oversteering.

Figure 6:
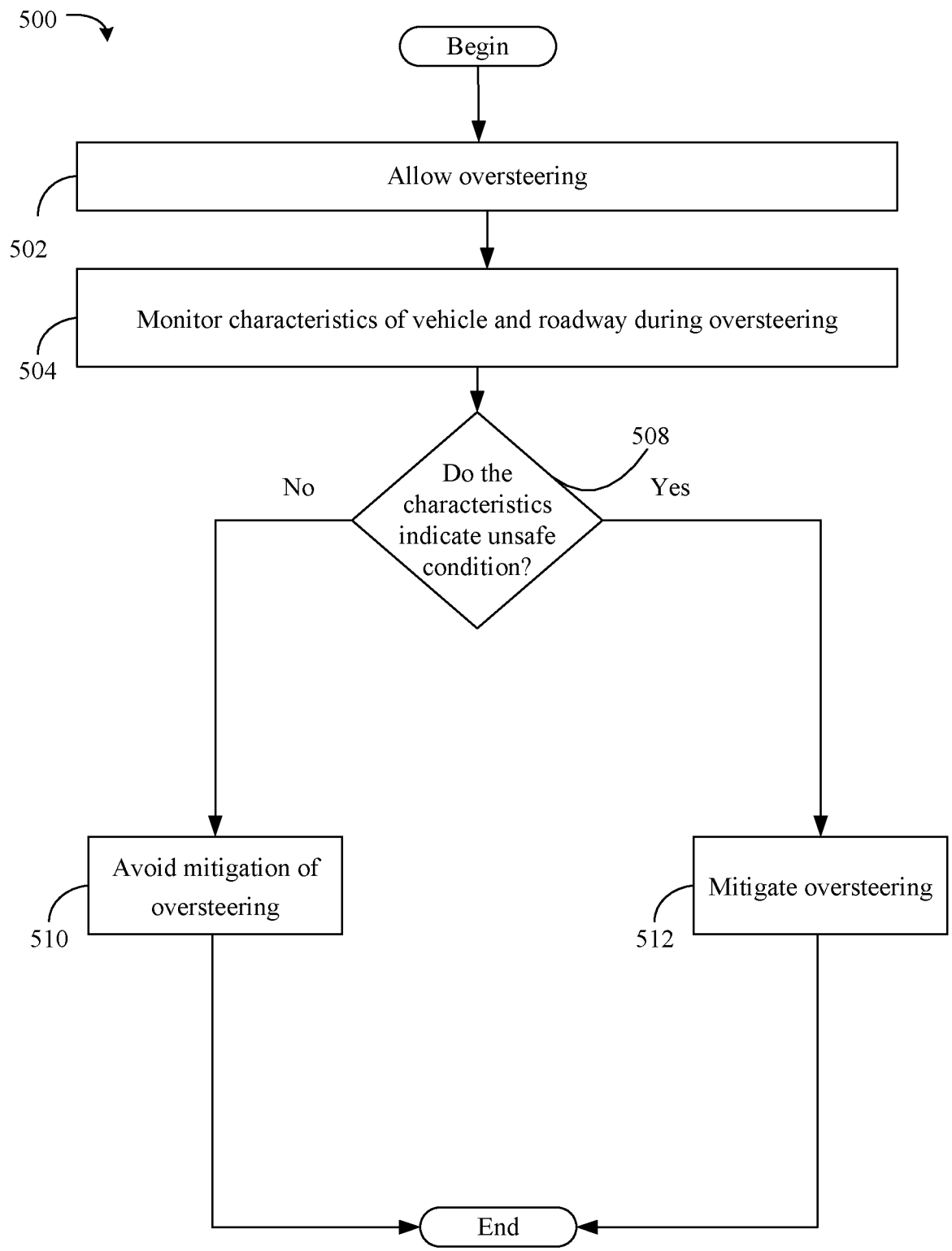
FIG. 6 is a flowchart of an example of a method of cancellation of oversteer engagement according to an embodiment.

FIG. 6 shows a method 500 of cancellation of oversteer engagement based on unsafe conditions. The method 500 may generally be implemented in conjunction with any of the embodiments described herein, for example the vehicle 102 of FIG. 1, the method 200 of FIG. 2, the vehicle 302 of FIG. 3, the vehicle 452 of FIG. 4 and method 400 of FIG. 5. In an embodiment, the method 500 is implemented in logic instructions (e.g., software), configurable logic, fixed-functionality hardware logic, non-transitory computer readable instructions that are executable to implement method 500, circuitry, etc., or any combination thereof.

Illustrated processing block 502 may allow oversteering to avoid mitigation of oversteering in a curve of a roadway (e.g., as a vehicle drives through the curve). Illustrated processing block 504 monitors characteristics of the vehicle (e.g., velocity, acceleration, current position) and the roadway (e.g., obstacle detection). Illustrated processing block 508 determines if the characteristics indicate an unsafe condition (e.g., whether the vehicle is predicted to strike an obstacle, spin out of control, drive off roadway, etc.). If so, illustrated processing block 512 mitigates oversteering. Otherwise, illustrated processing block 510 avoids mitigation of oversteering.

Figure 7:
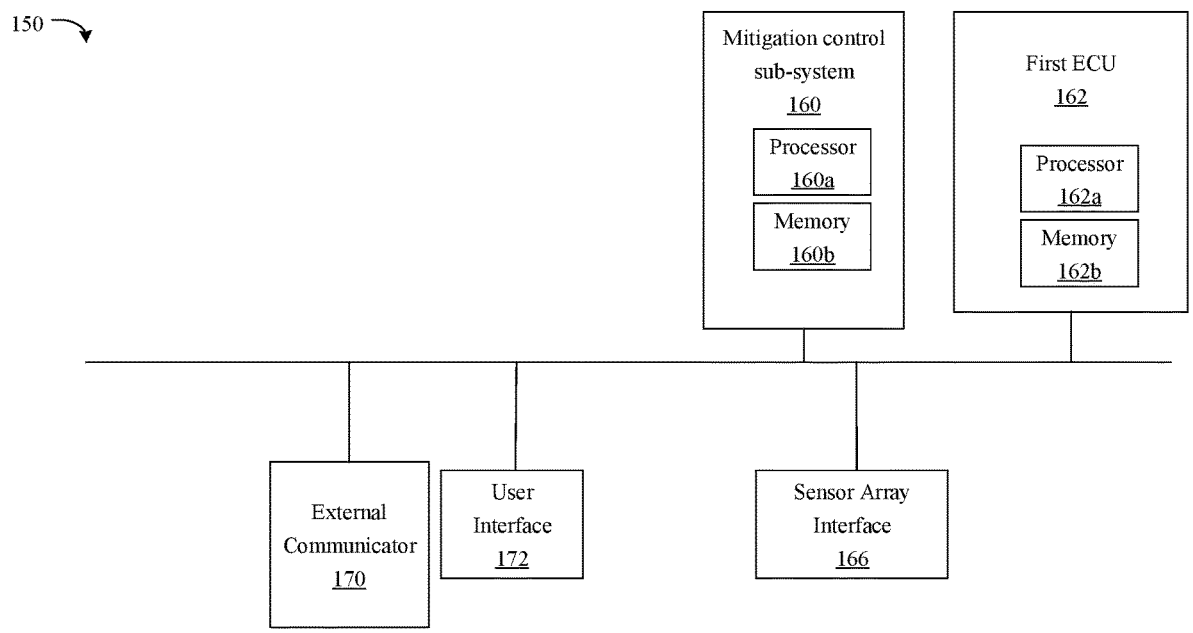
FIG. 7 is a block diagram of an example of a control system according to an embodiment.

FIG. 7 shows a more detailed example of a vehicle control and operation system 150 (e.g., a computing platform) to permit or correct oversteering in a vehicle. The illustrated system 150 may be readily included in for example the vehicle 102 of FIG. 1, the vehicle 302 of FIG. 3, the vehicle 452 of FIG. 4. The illustrated system 150 may be readily execute the method 200 of FIG. 2, the method 400 of FIG. 4, and the method 500 of FIG. 5.

In the illustrated example, the vehicle control and operation system 150 may include a mitigation control sub-system 160 and a first electronic control unit (ECU) 162. The system 150 may include a sensor array interface 166 that interfaces with a plurality of sensors, for example a global positioning system sensor, proximity sensor, image sensor, audio sensor, impact sensor, deceleration sensor, V2I systems, acceleration sensor to obtain sensor data. The sensor array interface 166 may interface with any type of sensor suitable for operations as described herein.

The mitigation control sub-system 160 may receive sensor data from the sensor array interface 166 to detect an oversteer condition and determine whether to mitigate, prevent and/or reduce the oversteer condition. The mitigation control sub-system 160 may control the first ECU 162 to mitigate the oversteer condition or suppress mitigation of the oversteer condition. In some embodiments, the mitigation control sub-system 160 may interface with one or more systems (e.g., a braking system) to permit or mitigate the oversteer condition. For example, the first ECU 162 may decelerate one or more wheels of the vehicle to correct the oversteer condition.

As illustrated, the mitigation control sub-system 160 may include a processor 160*a* (e.g., embedded controller, central processing unit/CPU) and a memory 160*b* (e.g., non-volatile memory/NVM and/or volatile memory) containing a set of instructions, which when executed by the processor 160*a*, cause the mitigation control sub-system 160 to control the first ECU 162 and/or one or more systems directly to mitigate the oversteer condition or suppress mitigation of the oversteer condition.

The first ECU 162 may include a processor 162*a* (e.g., embedded controller, central processing unit/CPU) and a memory 162*b* (e.g., non-volatile memory/NVM and/or volatile memory) containing a set of instructions, which when executed by the processor 162*a*, cause the first ECU 162 to control one or more systems to mitigate the oversteer condition when permitted.

The system 150 may further include a user interface 172 (e.g., audio and/or visual interface). The user interface 172 may allow a user to provide an instruction to trigger suppression of the mitigation of the oversteer condition. For example, the user may manually provide an input that oversteer conditions are not to be mitigated (e.g., disable mitigation of oversteer conditions).

The system 150 may further include an external communicator 170 to communicate with a third party and receive locality information (e.g., GPS data, V2I data, etc.). The external communicator 170 may be a wireless device, internet connection, etc.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

We claim:

1. A vehicle, comprising:
   at least one sensor to generate sensor data; and
   an oversteer mitigation sub-system coupled with the at least one sensor, wherein the oversteer mitigation sub-system includes at least one processor and at least one memory having a set of instructions, which when executed by the at least one processor, cause the oversteer mitigation sub-system to:
   control one or more systems to mitigate an oversteer condition of the vehicle or allow the oversteer condition;
   identify a curve in a roadway based on the sensor data;
   based on the curve in the roadway, conduct an identification that the oversteer condition is to be allowed for at least a portion of the curve; and
   in response to the identification that the oversteer condition is to be allowed, control the one or more systems to allow the oversteer condition for the at least the portion of the curve.

2. The vehicle of claim 1, wherein the instructions of the at least one memory, when executed, cause the oversteer mitigation sub-system to:
   identify that an exit position of the roadway is outside the curve; and
   in response to an identification that the vehicle has reached the exit position, control the one or more systems to mitigate the oversteer condition.

3. The vehicle of claim 1, wherein the instructions of the at least one memory, when executed, cause the oversteer mitigation sub-system to:
  determine that the oversteer condition of the vehicle is unsafe; and
  in response to the oversteer condition being determined to be unsafe, override the identification that the oversteer condition is allowed and control the one or more systems to mitigate the oversteer condition.

4. The vehicle of claim 1 wherein:
  the oversteer mitigation sub-system is one or more of an electronic stability control system or a traction control system; and
  the instructions of the at least one memory, when executed, cause the one or more of the electronic stability control system or the traction control system to mitigate the oversteer condition of the vehicle when the vehicle is outside the at least the portion of the curve.

5. The vehicle of claim 1, wherein the instructions of the at least one memory, when executed, cause the oversteer mitigation sub-system to:
  identify a radius of the curve; and
  determine that the oversteer condition is to be permitted in response to the radius being determined to be below a threshold.

6. The vehicle of claim 1, wherein the instructions of the at least one memory, when executed, cause the oversteer mitigation sub-system to control the one or more systems to suppress mitigation of the oversteer condition as the vehicle proceeds through the at least the portion of the curve.

7. The vehicle of claim 1, wherein the sensor data includes one or more of image data, localization data or light detection and ranging data.

8. At least one non-transitory computer readable storage medium comprising a set of instructions, which when executed by a computing platform, cause the computing platform to:
  control one or more systems to mitigate an oversteer condition of a vehicle or allow the oversteer condition;
  identify a curve in a roadway based on sensor data associated with the vehicle;
  based on the curve in the roadway, conduct an identification that the oversteer condition is to be allowed for at least a portion of the curve; and
  in response to the identification that the oversteer condition is to be allowed, control the one or more systems to allow the oversteer condition for the at least the portion of the curve.

9. The at least one non-transitory computer readable storage medium of claim 8, wherein the instructions, when executed, cause the computing platform to:
  identify that an exit position of the roadway is outside the curve; and
  in response to an identification that the vehicle has reached the exit position, control the one or more systems to mitigate the oversteer condition.

10. The at least one non-transitory computer readable storage medium of claim 8, wherein the instructions, when executed, cause the computing platform to:
  determine that the oversteer condition of the vehicle is unsafe; and
  in response to the oversteer condition being determined to be unsafe, override the identification that the oversteer condition is allowed and control the one or more systems to mitigate the oversteer condition.

11. The at least one non-transitory computer readable storage medium of claim 8, wherein the instructions, when executed, cause the computing platform to:
  mitigate, with one or more of an electronic stability control system or a traction control system, the oversteer condition of the vehicle when the vehicle is outside the at least the portion of the curve.

12. The at least one non-transitory computer readable storage medium of claim 8, wherein the instructions, when executed, cause the computing platform to:
  identify a radius of the curve; and
  determine that the oversteer condition is to be permitted in response to the radius being determined to be below a threshold.

13. The at least one non-transitory computer readable storage medium of claim 8, wherein the instructions, when executed, cause the computing platform to control the one or more systems to suppress mitigation of the oversteer condition as the vehicle proceeds through the at least the portion of the curve.

14. The at least one non-transitory computer readable storage medium of claim 8, wherein the sensor data includes one or more of image data, localization data or light detection and ranging data.

15. A method comprising:
  controlling one or more systems to mitigate an oversteer condition of a vehicle or allow the oversteer condition;
  identifying a curve in a roadway based on sensor data associated with the vehicle;
  based on the curve in the roadway, conducting an identification that the oversteer condition is to be allowed for at least a portion of the curve; and
  in response to the identification that the oversteer condition is to be allowed, controlling the one or more systems to allow the oversteer condition for the at least the portion of the curve.

16. The method of claim 15, further comprising:
  determining that the oversteer condition of the vehicle is unsafe; and
  in response to the oversteer condition being determined to be unsafe, overriding the identification that the oversteer condition is allowed and controlling the one or more systems to mitigate the oversteer condition.

17. The method of claim 15, further comprising:
  mitigating, with one or more of an electronic stability control system or a traction control system, the oversteer condition of the vehicle when the vehicle is outside the at least the portion of the curve.

18. The method of claim 15, further comprising:
  identifying a radius of the curve; and
  determining that the oversteer condition is to be permitted in response to the radius being determined to be below a threshold.

19. The method of claim 18, further comprising:
  suppressing mitigation of the oversteer condition as the vehicle proceeds through the at least the portion of the curve.

20. The method of claim 15, wherein the sensor data includes one or more of image data, localization data or light detection and ranging data.

* * * * *